US012355315B2

(12) United States Patent
Hung et al.

(10) Patent No.: US 12,355,315 B2
(45) Date of Patent: Jul. 8, 2025

(54) ELECTRIC MOTOR

(71) Applicant: DELTA ELECTRONICS, INC., Taoyuan (TW)

(72) Inventors: Hsien-Feng Hung, Taoyuan (TW); Cheng-Yu Shen, Taoyuan (TW); Chung-Han Yang, Taoyuan (TW); Quan-Sheng Lin, Taoyuan (TW); Yi Chen, Taoyuan (TW); Cong-Xiang Ma, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 259 days.

(21) Appl. No.: 18/325,013

(22) Filed: May 29, 2023

(65) Prior Publication Data

US 2024/0305169 A1  Sep. 12, 2024

(30) Foreign Application Priority Data

Mar. 7, 2023  (CN) .......................... 202310210992.X

(51) Int. Cl.
  *H02K 11/33*  (2016.01)
  *H02K 3/50*  (2006.01)
  *H02K 11/01*  (2016.01)

(52) U.S. Cl.
  CPC ............... *H02K 11/33* (2016.01); *H02K 3/50* (2013.01); *H02K 11/014* (2020.08); *H02K 2203/09* (2013.01); *H02K 2211/03* (2013.01)

(58) Field of Classification Search
  CPC ........ H02K 11/33; H02K 3/50; H02K 11/014; H02K 2203/09; H02K 2211/03; H02K 11/01; H02M 7/003
  See application file for complete search history.

(56) References Cited

U.S. PATENT DOCUMENTS

| 8,963,477 | B2 * | 2/2015 | Okada ..................... H02P 25/08 |
| | | | 318/800 |
| 11,081,937 | B2 | 8/2021 | Huang et al. |
| 2003/0200761 | A1 | 10/2003 | Funahashi et al. |
| 2012/0098361 | A1 | 4/2012 | Yamasaki et al. |
| 2018/0093698 | A1 | 4/2018 | Urimoto et al. |

(Continued)

FOREIGN PATENT DOCUMENTS

| CN | 102804559 A | 11/2012 |
| CN | 102811017 A | 12/2012 |

(Continued)

*Primary Examiner* — Mohamad A Musleh
(74) *Attorney, Agent, or Firm* — CKC & Partners Co., LLC

(57) ABSTRACT

An electric motor includes a motor main body and an inverter. The inverter is axially stacked on one end of the motor main body, and the inverter includes a gate driver, a control circuit, a capacitor module, a DC bus bar, a plurality of power modules and a plurality of AC bus bars. The power module includes a plurality of AC output terminals, a plurality of DC input terminals and a plurality of signal terminals, and the AC bus bars are respectively connected to corresponding AC output terminals and extend downward to a motor coil of the motor main body. The power modules and the corresponding DC input terminals are annularly arranged around the capacitor module, the DC bus bar is extended and electrically connected to the corresponding DC input terminals and the capacitor module.

16 Claims, 2 Drawing Sheets

(56) References Cited

U.S. PATENT DOCUMENTS

2020/0298654 A1\* 9/2020 Kagawa ............. B60H 1/00642
2021/0344295 A1 11/2021 Hotta et al.
2022/0190684 A1 6/2022 Druant et al.

FOREIGN PATENT DOCUMENTS

| CN | 106464089 B | | 9/2019 | |
|---|---|---|---|---|
| CN | 113381566 A | | 9/2021 | |
| JP | 2011010409 A | \* | 1/2011 | ........... H02K 11/024 |
| TW | 201911728 A | | 3/2019 | |
| TW | I666868 B | | 7/2019 | |
| TW | 202143608 A | | 11/2021 | |

\* cited by examiner

ELECTRIC MOTOR

RELATED APPLICATIONS

This application claims priority to Chinese Patent Application Serial Number 202310210992.X, filed Mar. 7, 2023, the disclosures of which are incorporated herein by reference in their entireties.

TECHNICAL FIELD

The present disclosure relates to an electric motor. More particularly, the present disclosure relates to an integrated electric motor integrating a multiphase control inverter and a multiphase alternating current (AC) electric motor.

BACKGROUND

With the advancement of science and technology in recent years, electric vehicles have become a priority industry in various countries. Electric vehicles generally use battery packs to provide power for the electric vehicles, and use inverter systems to convert direct current into alternating current with variable frequency and current to drive the electric motors of the electric vehicles. In different operating conditions, the inverter may be operated in a motor mode and a power generation mode. In the motor mode, the inverter outputs AC current to rotate the electric motor, while in the power generation mode, the electric motor uses the kinetic energy to convert the alternating current to the direct current so as to charge the battery pack to realize energy recovery.

The inverter is an important component of the powertrain system of the electric vehicle, and plays a key role in the electric vehicle powertrain system. The inverter converts the DC power supplied from the battery pack into AC power to drive the electric motor of the electric vehicle, and controls the timing changes in the switching duty cycle to adjust the AC charging frequency to control the speed of the electric motor, just like fuel injection and ignition systems play a role in the internal combustion engine. A higher speed and efficiency of the inverter can improve the overall efficiency of the electric vehicle so as to increase the endurance mileage of the battery pack of the electric vehicle. The DC-AC conversion method is to control the switching sequence of each phase switch with the switching strategy, and uses frequency and current control command or torque control command to adjust the output of the converter so as to drive the electric motor to provide speed and torque. A higher frequency may provide a higher speed of the electric motor and a higher output current may provide a stronger torque of the electric motor so that a greater kinetic energy of the electric vehicle can be provided. Therefore, a better overall efficiency of the electric vehicle, a lower discharge speed of the battery pack and an increased endurance mileage may be obtained according to a better efficiency adjustment of the electric motor.

Generally speaking, the electric vehicle motor driving inverter will select the appropriate as type of power switch element, such Metal-Oxide-Semiconductor Field-Effect Transistor (MOSFET), Insulated Gate Bipolar Transistor (IGBT) or silicon carbide (SiC) power components, according to the operating voltage and switching frequency range. According to the voltage, current and temperature consideration, the power switching components are determined. In addition, an appropriate heat dissipation method has to be designed to reduce the heat generated by the power switching components while the electric motor driving inverter is working.

Due to the requirements of the placement space and operating temperature control of the electric vehicle powertrain system, there is a need to increase the output power of the electric motor driving inverter under a limited volume and improve the overall assembly efficiency of the electric motor.

SUMMARY

The summary of the present invention is intended to provide a simplified description of the disclosure to enable readers to have a basic understanding of the disclosure. The summary of the present invention is not a complete overview of the disclosure, and it is not intended to point out the importance of the embodiments/key elements of the present invention or define the scope of the invention.

One objective of the embodiments of the present invention is to provide an electric vehicle motor driving inverter system to serially connect the inverter and the motor main body with a small volume design. In addition, the inverter appearance and the circuit layout structure are designed according to the connections of the cooper bus bars of the AC output terminals of the inverter and the heat dissipation effect of the power switching module so as to avoid the heat impact on the electronic components of the circuit board, improve the control signal paths and achieve a high power density motor driving inverter.

To achieve these and other advantages and in accordance with the objective of the embodiments of the present invention, as the embodiment broadly describes herein, the embodiments of the present invention provides an electric motor including a motor main body and an inverter. The motor main body includes a motor coil and the inverter is axially stacked on one end of the motor main body. The inverter includes a gate driver, a control circuit, a capacitor module, a DC bus bar, a plurality of power modules and a plurality of AC bus bars. The power modules include a plurality of AC output terminals, a plurality of DC input terminals and a plurality of signal terminals. The AC bus bars are respectively connected to corresponding AC output terminals and extended downward to the motor coil of the motor main body. In addition, the power modules and the corresponding DC input terminals are annularly arranged around the capacitor module, the DC bus bar is extended and electrically connected to the corresponding DC input terminals and electrically connected to the capacitor module so that the power modules are respectively connected in parallel with the capacitor module, and the signal terminals of the power modules are electrically connected to the gate driver and the control circuit.

In some embodiments, the electric motor further includes a circuit board, and the gate driver and the control circuit are disposed on the circuit board.

In some embodiments, the AC bus bars are arranged annularly on a periphery of the circuit board, and the circuit board further includes a plurality of sensors disposed on the circuit board and corresponding to the AC bus bars.

In some embodiments, the electric motor further includes a plurality of U-shaped magnetic shields, and the U-shaped magnetic shields are located corresponding to the AC output terminals and the sensors. In addition, the U-shaped magnetic shields surround corresponding AC output terminals and sensors.

In some embodiments, each of the AC bus bars further includes an extended AC bus bar. In addition, the one end of the each of the AC bus bars is respectively electrically connected to one corresponding AC output terminal of the AC output terminals and another end of the each of the AC bus bars is electrically connected to a corresponding extended AC bus bar, and the each of the AC bus bars and the extended AC bus bar are mechanically connected together so as to electrically connected to each other, and the extended AC bus bar extends downward to the motor coil of the motor main body.

In some embodiments, a mechanical connection of the each of the AC bus bars and the extended AC bus bar is located at a circuit board uncovered area to allow mechanically connecting together in-situ.

In some embodiments, the power modules, the DC bus bar and the capacitor module are located under the circuit board, and the signal terminals of the power modules are electrically connected to the circuit board to further electrically connected to the gate driver and the control circuit, and the motor main body is located under the inverter.

In some embodiments, the inverter is disposed in the inverter housing, the motor main body is disposed in a motor housing, and the inverter housing and the motor housing are axially mechanically connected together.

In some embodiments, a mechanical connection of the each of the AC bus bars and the extended AC bus bar is mechanically connected together by a fastening device so as to electrically connect to each other.

In some embodiments, a mechanical connection of the each of the AC bus bars and the extended AC bus bar is mechanically connected together by welding so as to electrically connect to each other.

In some embodiments, each of power modules respectively includes a plurality of power switching arms.

In some embodiments, each of the power modules respectively includes two AC output terminals respectively electrically connected to a corresponding AC bus bar, and each of the AC bus bars and the corresponding extended AC bus bar are mechanically connected together to electrically connected together, the extended AC bus bars extend downward to the motor coil of the motor main body. In addition, the AC bus bars belonging to one power module of the power modules are annually arranged on the periphery of the circuit board, and respectively extended two sides of the one power module of the power modules.

In some embodiments, the power switching arms belonging to one of the power modules respectively convert and output a single-phase alternating current, and the power switching arms respectively includes one of the AC output terminals, and each of the AC output terminals is respectively electrically connected to one of the AC bus bars.

In some embodiments, each of the power modules respectively includes a plurality of power switching arms.

In some embodiments, the power switching arms belonging to one of the power module respectively convert and output a single-phase alternating current, and each of the power switching arms respectively includes one of the AC output terminals, and each of the AC output terminals is respectively electrically connected to one of the AC bus bars.

In some embodiments, the power switching arms belonging to one of the power module respectively convert and output a single-phase alternating current in parallel and are electrically connected together to one of the AC bus bars.

Hence, the electric motor has an inverter and a motor main body axially stacked together so as to reduce the distance extending from the motor coil to the inverter, reduce the entire volume of the whole inverter, simplify the assembly structure of the inverter and the motor main body, and therefore reduce the overall weight of the electric motor. In addition, the power switching components are annularly arranged to allow the inverter and the motor main body of the electric motor are axially stacked together to reduce the volume of the inverter. In addition, a plurality of power modules may respectively output two-phase current to replace a three-phase system with a multiple phase system so as to reduce the current value of each power switching module and further reduce the volume of the power switching module under the same power output to achieve a high power density inverter system. In addition, the electric motor may reduce the distance extending from the motor coil to the inverter, reduce the entire volume of the whole inverter, simplify the assembly structure of the inverter and the motor main body, and therefore reduce the overall weight of the electric motor by way of the inverter and the motor main body axially stacked together.

BRIEF DESCRIPTION OF THE DRAWINGS

The disclosure can be more fully understood by reading the following detailed description of the embodiment, with reference made to the accompanying drawings as follows.

DETAILED DESCRIPTION OF THE PREFERRED EMBODIMENT

Figure 1:
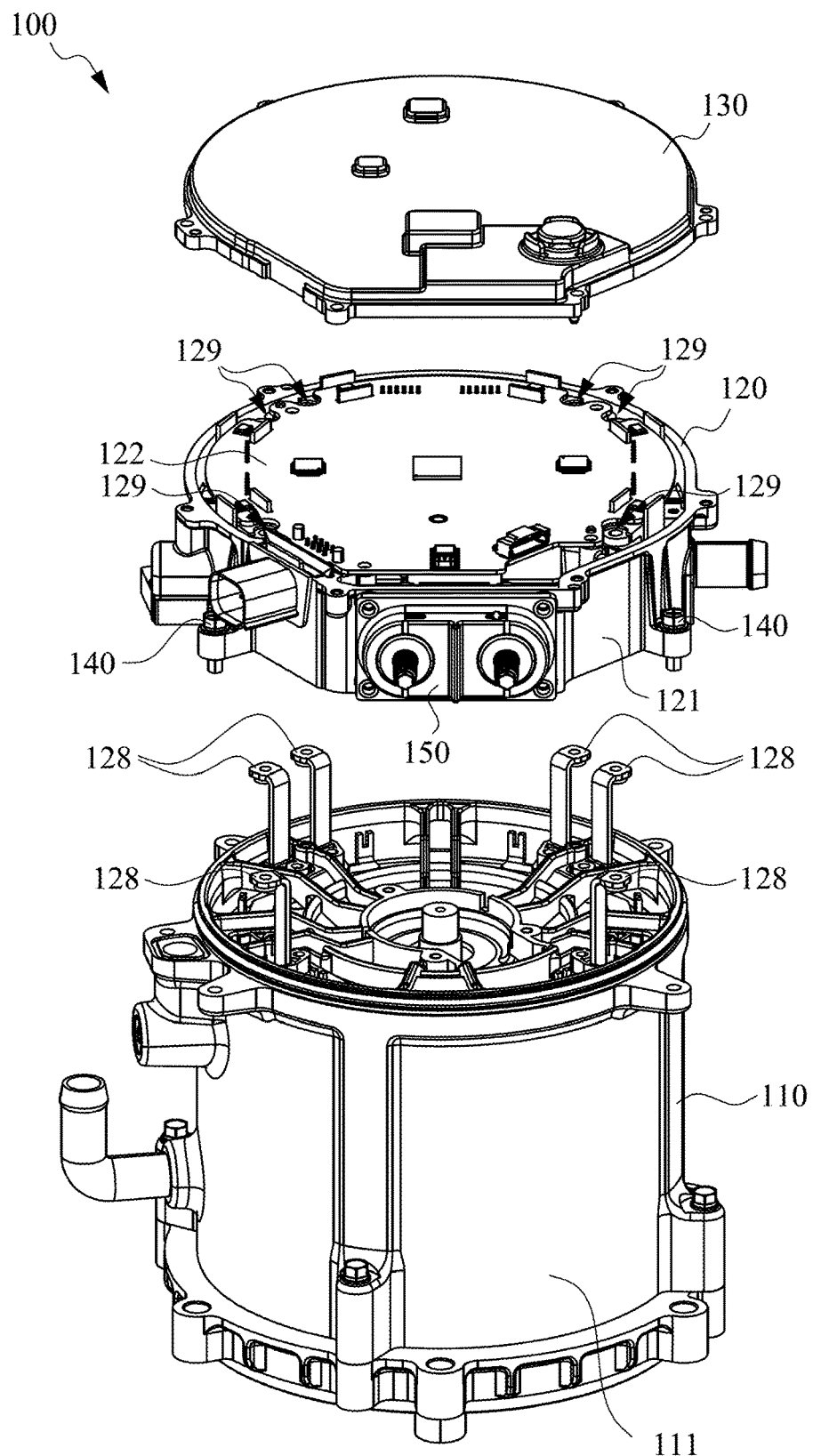
FIG. 1 illustrates an exploded schematic diagram of an electric motor according to one embodiment of the present invention.

The following is a detailed description of the embodiments in conjunction with the accompanying drawings, but the provided embodiments are not intended to limit the scope of the disclosure, and the description of the structure and operation is not used to limit the execution sequence thereof. The structure of the recombination of components and the resulting devices with equal functions are all within the scope of this disclosure. In addition, the drawings are for illustration purposes only, and are not drawn according to the original scale. For ease of understanding, the same reference numbers are used in the drawings and the description to refer to the same or like parts.

In addition, the terms used in the entire description and the scope of the patent application, unless otherwise specified, usually have the usual meaning of each term used in this field, in the content disclosed here and in the special content. Some terms used to describe the disclosure are discussed below or elsewhere in this specification to provide additional guidance to those skilled in the art in the disclosure.

In the implementation mode and the scope of the present application, unless the article is specifically limited in the context, "a" and "the" can generally refer to a single or pluralities. In the steps, the numbering is only used to conveniently describe the steps, rather than to limit the sequence and implementation.

Secondly, the words "comprising", "including", "having", "containing" and the like used in the present application are all open language, meaning including but not limited to.

Figure 2:
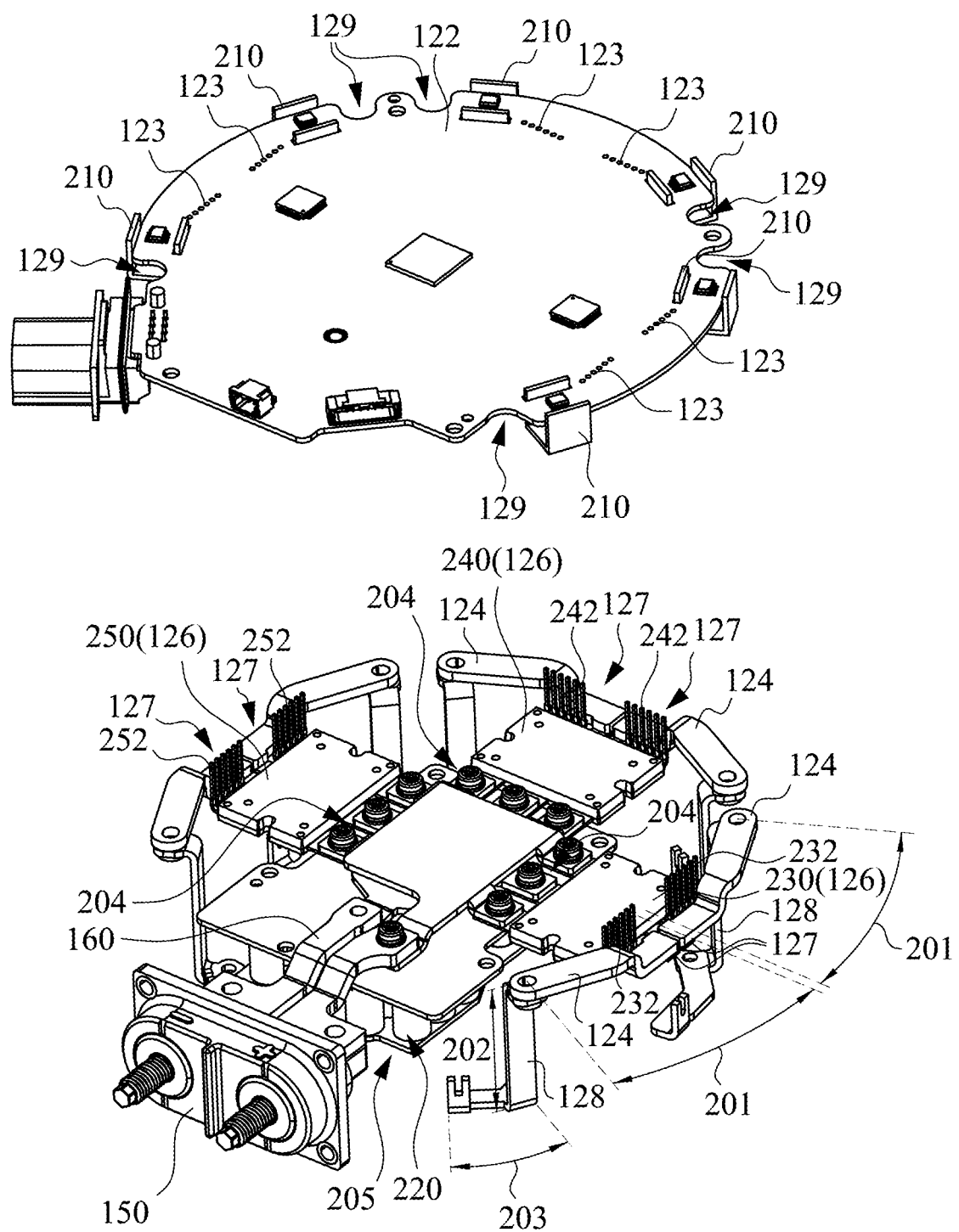
FIG. 2 illustrates a partial exploded schematic diagram of an inverter of the electric motor according to one embodiment of the present invention.

FIG. 1 illustrates an exploded schematic diagram of an electric motor according to one embodiment of the present invention and FIG. 2 illustrates a partial exploded schematic diagram of an inverter thereof.

Referring to FIG. 1, as shown in the drawing, the electric motor 100 includes a motor main body 110 and an inverter 120. The inverter 120 is axially stacked on one end of the motor main body 110.

In some embodiments, the electric motor 100 is, for example, a motor driving system for a vehicle, preferably a multiphase AC motor driving system, but not limited thereto.

The inverter housing 121 is designed in a disk shape and directly axially connected to the motor housing 111 to eliminate an additional housing structure for supporting the inverter 120 so as to reduce the whole weight of the electric motor 100. The top side of the inverter housing 121 is sealed by an upper cover 130, and the bottom side of the inverter housing 121 is sealed to the motor housing 111 of the motor main body 110.

In addition, simultaneously referring to FIG. 2, the inverter 120 includes a direct current (DC) power input connector 150, a DC bus bar 160, a circuit board 122, a plurality of power modules 126 and a plurality of AC bus bars 124. Each of the power modules 126 includes DC input terminals 204, at least one AC output terminal 127 and a plurality of signal terminals 252, and the AC output terminals 127 are annularly located on the periphery of the circuit board 122.

The DC power of the battery pack is transmitted to the DC bus bar 160 through the DC power input connector 150, then transmitted to the DC input terminals 204 of the power modules 126, converted from the DC power into the AC power by the power modules 126, and outputted by way of the AC output terminals 127.

The power modules 126 and corresponding DC input terminals 204 are annularly arranged around the capacitor module 220, the DC bus bar 160 is extended and electrically connected to corresponding DC input terminals 204, and is electrically connected to the capacitor module 220 so that the power modules 126 are respectively connected in parallel with the capacitor module 220, and the signal terminals 252 of the power modules 126 are electrically connected to the circuit board 122.

The AC output terminals 127 of the power modules 126 are respectively connected to corresponding AC bus bars 124, and extended downward to the motor coil of the motor main body 110 through the extended AC bus bars 128. Because the AC bus bars 124 are directly connected to the AC output terminals 127 and the extended AC bus bars 128 are further extended downward to the motor coil of the motor main body 110, the distance from the motor coil of the motor main body 110 to the inverter 120 is reduced so as to reduce the required volume of the whole inverter 120 and reduce the copper loss under high current.

In addition, the AC bus bars 124 and the extended AC bus bars 128 may be integrally formed together to directly connect the AC output terminals 127 to the motor coil of the motor main body 110. In some embodiments, the AC bus bars 124 and the extended AC bus bars 128 are respectively formed and mechanically connected together to electrically connected to the motor coil of the motor main body 110 through the downward extension of the extended AC bus bars 128. In addition, the mechanical connection may be a fastening device, such as screws or welding, without departing from the spirit and protection scope of the present invention.

In some embodiments, a mechanical connection of the AC bus bar 124 and the corresponding extended AC bus bar 128 thereof is located at a circuit board uncovered area 129 to provide an operation space for mechanically connecting together in situ.

In some embodiments, the power modules 126, the DC bus bar 160 and the capacitor module 220 are located under the circuit board 122, and the signal terminals 252 of the power modules 126 are electrically connected to the circuit board 122, and further electrically connected to the gate driver and the control circuit. In addition, the motor main body 110 is located under the inverter 120.

In some embodiments, the AC bus bars 124 may directly extend from the AC output terminals 127 and downward to the motor coil of the motor main body 110, without departing from the spirit and protection scope of the present invention. In some embodiments, the extended AC bus bars 128 may directly extend from the motor coil of the motor main body 110 and upward to the AC output terminals 127, without departing from the spirit and protection scope of the present invention.

In some embodiments, the AC bus bars 124 and the extended AC bus bars 128 are transversely extended from the AC output terminals 127 a lateral distance 201, then downward connected the motor coil of the motor main body 110. Therefore, the AC bus bars 124 may form a gull wing shape and extend from the AC output terminals 127 of the power module 126 to both sides to provide a space to install a sensor 210. The sensor 210 is located on the circuit board 122 and corresponding to the AC bus bars 124 to detect the output current of the corresponding AC bus bar 124.

In addition, by way of the extended AC bus bars 128 connected to the AC bus bars 124, the AC bus bars 124 and the extended AC bus bars 128 may further downward extend a height 202, and then transversely extend a transverse distance 203 so that the AC bus bars 124 and the extended AC bus bars 128 may uniformly connect to the motor coil of the motor main body 110 to improve the stability and safety of the circuit of the inverter 120 and the electric motor 100.

In some embodiments, the sensor 210 is a current sensor, for example a current sensor with a U-shaped magnetic shield such as a U shield current sensor, to detect the output current of the AC bus bars 124. The U-shaped magnetic shields are located corresponding to the AC output terminals 127 and the sensor 210, and the U-shaped magnetic shields surrounds corresponding AC output terminals 127 and sensor 210 in sequence.

In some embodiments, the extended AC bus bars 128 may be fixed to the AC bus bars 124 with screws or the like, and the AC bus bars 124 is accommodated in the inverter housing 121 of the inverter 120, and the position where the screws are fixed is also located in the inverter housing 121 of the inverter 120. That is to say, the fixing positon is located at the power stage, i.e. located in the inverter 120, so as to effectively increase the convenience of assembling the motor main body 110 and the inverter 120. In addition, the extended AC bus bars 128 further extends from the inverter housing 121 to the motor housing 111 of the motor main body 110.

In some embodiments, the inverter 120 further includes a capacitor module 220, including one or more capacitors. Preferably, the capacitor module 220 is located in a central area 205 surrounding with the power modules 126 to uniform the current flowing distances between the capacitor module 220 and the power modules 126, and the capacitor module 220 may locate close to the power modules 126 to effectively increase the working efficiency of the capacitor module 220. In addition, the heat generated by the capacitor module 220 under working may conveniently be taken away by heat dissipation devices such as heat dissipation pads.

In some embodiments, the power modules 126 includes a plurality of two-phase power modules, e.g. a first two-phase power module 230, a second two-phase power module 240 and a third two-phase power module 250, and the AC bus bars 124 are annularly located on the periphery of the circuit board 122, and the two-phase power modules 126 are annularly located inside the AC bus bars 124.

In some embodiments, signal terminals 232 of the first two-phase power module 230, signal terminals 242 of the second two-phase power module 240 and signal terminals 252 of the third two-phase power module 250 respectively pass through openings 123 of the circuit board 122 and are fixed on the circuit board 122, and the sensors 210 are disposed on the circuit board 122 and corresponded to the AC bus bars 124 to detect the output currents of the AC bus bars 124.

By way of the first two-phase power module 230, the second two-phase power module 240 and the third two-phase power module 250 surrounding on the periphery of the circuit board 122, the heat generated by the power modules 126 and the AC output terminals 127 may therefore reduce the impact on the electronic components on the circuit board 122. In addition, the annular arrangement of the AC bus bars 124, the extended AC bus bars 128 and the power modules 126 is more helpful to the heat dissipation of the inverter 120, and may effectively avoid the length differences of the control signal paths therebetween so as to uniform the signal noise and conveniently eliminate the noise interference generated by the inverter 120.

In addition, the annular arrangement of the two-phase power modules on the periphery of the circuit board 122 may further simplify the circuit layout of the inverter 120 as well as simplify the components and structure of the inverter 120 and the electric motor 100.

In some embodiments, the circuit board 122 may be a driving circuit board such as an integrated circuit board integrated with the gate driver and the control circuit board to effectively simplify the assembly structure of the inverter 120 and improve the productivity of the inverter 120 and the electric motor 100. In addition, the signal terminals 252 of the power modules 126 are electrically connected to the gate driver and the control circuit on the circuit board 122.

In some embodiments, each of the power modules 126 respectively includes a plurality of power switching arms. In addition, each of the power modules 126 respectively includes two AC output terminals 127 respectively electrically connected to corresponding AC bus bars 124, and each of the AC bus bars 124 and corresponding extended AC bus bars 128 are mechanically connected to electrically connect each other, and the extended AC bus bars 128 are extended downward to the motor coil of the motor main body 110. Furthermore, the AC bus bars 124 belonging to one power module 126 are respectively arranged side by side on the periphery of the circuit board 122 and extend toward two sides of the power module 126 thereof. In addition, the power switching arms belonging to one power module 126 respectively convert and output the single-phase alternating current, each of the power switching arms respectively includes one AC output terminal 127, and each of the AC output terminals 127 is respectively electrically connected to the one corresponding AC bus bar 124.

In some embodiments, the power modules 126 respectively include a plurality of power switching arms. The power switching arms belonging to one power module 126 respectively convert and output the single-phase alternating current, and the power switching arms respectively include one AC output terminal 127, each of the AC output terminals 127 is respectively electrically connected to one AC bus bar 124. In addition, the power switching arms belonging to the same one power module 126 are connected in parallel to convert and output a single-phase alternating current, and the power switching arms are electrically connected to one AC bus bar 124.

In some embodiments, the motor housing 111 of the motor main body 110 and the inverter housing 121 of the inverter 120 are made of metal to increase the heat dissipation efficiency and strength of the inverter 120 and the electric motor 100.

In some embodiments, the inverter 120 is accommodated in the inverter housing 121, the motor main body 110 is accommodated in the motor housing 111, and the inverter housing 121 and the motor housing 111 are axially connected together up and down.

In some embodiments, the motor housing 111 and the inverter housing 121 are fixed together with fastening devices such as screws 140 to axially lock and seal together.

Accordingly, the electric motor may simplify the circuit layout of the inverter, avoid the heat generated by the power modules and the AC output terminals impacting on the electronic components on the circuit board, and simultaneously improve the noise influence of the control signal with the two-phase power modules and the AC output terminals arranged annularly on a periphery of the circuit board. In addition, the electric motor has an inverter and a motor main body axially stacked together so as to reduce the distance extending from the motor coil to the inverter, reduce the entire volume of the whole inverter, simplify the assembly structure of the inverter and the motor main body, and therefore reduce the overall weight of the electric motor.

What is claimed is:

1. An electric motor, comprising:
   a motor main body, wherein the motor main body comprises a motor coil; and
   an inverter, wherein the inverter is axially stacked on one end of the motor main body, wherein the inverter comprises:
   a gate driver;
   a control circuit;
   a capacitor module;
   a DC bus bar;
   a plurality of power modules, wherein the power modules comprise a plurality of AC output terminals, a plurality of DC input terminals and a plurality of signal terminals; and
   a plurality of AC bus bars respectively connected to corresponding AC output terminals and extended downward to the motor coil of the motor main body, wherein the power modules and corresponding DC input terminals of the DC input terminals are annularly arranged around the capacitor module, the DC bus bar is extended and electrically connected to the corresponding DC input terminals and electrically connected to the capacitor module so that the power modules are respectively connected in parallel with the capacitor module, and the signal terminals of the power modules are electrically connected to the gate driver and the control circuit.

2. The electric motor of claim 1, further comprising a circuit board, wherein the gate driver and the control circuit are disposed on the circuit board.

3. The electric motor of claim 2, wherein the AC bus bars are arranged annularly on a periphery of the circuit board, and the circuit board further comprises a plurality of sensors disposed on the circuit board and corresponding to the AC bus bars.

4. The electric motor of claim 3, further comprising a plurality of U-shaped magnetic shields, wherein the U-shaped magnetic shields are located corresponding to the AC output terminals and the sensors, wherein the U-shaped magnetic shields surround corresponding AC output terminals and sensors.

5. The electric motor of claim 3, wherein each of the AC bus bars further comprises an extended AC bus bar, wherein one end of the each of the AC bus bars is respectively electrically connected to one corresponding AC output terminal of the AC output terminals and another end of the each of the AC bus bars is electrically connected to a corresponding extended AC bus bar, and the each of the AC bus bars and the extended AC bus bar are mechanically connected together so as to electrically connected to each other, and the extended AC bus bar extend downward to the motor coil of the motor main body.

6. The electric motor of claim 5, wherein a mechanical connection of the each of the AC bus bars and the extended AC bus bar is located at a circuit board uncovered area to allow mechanically connecting together in-situ.

7. The electric motor of claim 6, wherein the power modules, the DC bus bar and the capacitor module are located under the circuit board, and the signal terminals of the power modules are electrically connected to the circuit board to further electrically connected to the gate driver and the control circuit, and the motor main body is located under the inverter.

8. The electric motor of claim 7, wherein the inverter is disposed in an inverter housing, the motor main body is disposed in a motor housing, and the inverter housing and the motor housing are axially mechanically connected together.

9. The electric motor of claim 5, wherein a mechanical connection of the each of the AC bus bars and the extended AC bus bar is mechanically connected together by a fastening device so as to electrically connect to each other.

10. The electric motor of claim 5, wherein a mechanical connection of the each of the AC bus bars and the extended AC bus bar is mechanically connected together by welding so as to electrically connect to each other.

11. The electric motor of claim 5, wherein each of the power modules respectively comprises a plurality of power switching arms.

12. The electric motor of claim 11, wherein the each of the power modules respectively comprises two AC output terminals respectively electrically connected to a corresponding AC bus bar of the AC bus bars, and each of the AC bus bars and the corresponding extended AC bus bar are mechanically connected together to electrically connected together, the extended AC bus bar extends downward to the motor coil of the motor main body, wherein the AC bus bars belonging to one power module of the power modules are annually arranged on the periphery of the circuit board, and respectively extended two sides of the one power module of the power modules.

13. The electric motor of claim 12, wherein the power switching arms belonging to one of the power modules respectively convert and output a single-phase alternating current, and the power switching arms respectively comprises one of the AC output terminals, and each of the AC output terminals is respectively electrically connected to one of the AC bus bars.

14. The electric motor of claim 1, wherein each of the power modules respectively comprises a plurality of power switching arms.

15. The electric motor of claim 14, wherein the power switching arms belonging to one of the power modules respectively convert and output a single-phase alternating current, and each of the power switching arms respectively comprises one of the AC output terminals, and each of the AC output terminals is respectively electrically connected to one of the AC bus bars.

16. The electric motor of claim 14, wherein the power switching arms belonging to one of the power modules respectively convert and output a single-phase alternating current in parallel and are electrically connected together to one of the AC bus bars.

* * * * *